US008427822B2

(12) United States Patent
Fukuda

(10) Patent No.: US 8,427,822 B2
(45) Date of Patent: Apr. 23, 2013

(54) STORAGE DEVICE

(75) Inventor: Takuhei Fukuda, Nagoya (JP)

(73) Assignee: Buffalo Inc., Nagoya (JP)

( * ) Notice: Subject to any disclaimer, the term of this patent is extended or adjusted under 35 U.S.C. 154(b) by 295 days.

(21) Appl. No.: 12/916,280

(22) Filed: Oct. 29, 2010

(65) Prior Publication Data
US 2011/0110212 A1    May 12, 2011

(30) Foreign Application Priority Data

Nov. 6, 2009 (JP) ................................ 2009-254497

(51) Int. Cl.
*H05K 5/00* (2006.01)
*H05K 7/00* (2006.01)

(52) U.S. Cl.
USPC ............ 361/679.34; 361/679.33; 361/679.35; 361/679.36

(58) Field of Classification Search ............. 361/679.33, 361/679.34, 679.35, 679.36
See application file for complete search history.

(56) References Cited

U.S. PATENT DOCUMENTS

| 7,616,436 | B2 * | 11/2009 | DeMoss et al. | 361/679.34 |
| 7,639,490 | B2 * | 12/2009 | Qin et al. | 361/679.34 |
| 2006/0034048 | A1 * | 2/2006 | Xu | 361/685 |
| 2006/0181845 | A1 * | 8/2006 | Shah et al. | 361/685 |

FOREIGN PATENT DOCUMENTS

JP     2005-158185 A    6/2005

* cited by examiner

*Primary Examiner* — Anthony Haughton
(74) *Attorney, Agent, or Firm* — Beyer Law Group LLP

(57) ABSTRACT

The hard disk drive device includes a casing, a hard disk drive unit, and cushioning members interposed between the hard disk drive unit and the inside wall of the casing and adapted to receive stress and absorb impact stress through strain. The cushioning members include a first layer situated towards the inside wall of the hard disk drive unit, a second layer situated towards the hard disk drive unit, and a third layer situated between the first layer and the second layer. The individual materials of the cushioning members are established such that the third layer has lower hardness than the first layer and the second layer, based on JIS K6253 standard.

3 Claims, 4 Drawing Sheets

STORAGE DEVICE

CROSS REFERENCE TO RELATED APPLICATIONS

This application claims the benefit of and priority from Japanese Application No. 2009-254497 filed Nov. 6, 2009, the content of which is incorporated herein by reference.

BACKGROUND OF THE INVENTION

1. Field of the Invention

The present invention relates to a storage device furnished with cushioning members for protecting the disk drive unit from external shocks.

2. Description of the Related Art

Among storage devices of this kind, one known technology relating to a hard disk drive device is disclosed in JP-A 2005-158185 for example. The hard disk drive device includes a hard disk drive unit housed within a casing, and cushioning members interposed between the hard disk drive unit and the inside wall of the casing and adapted to receive stress and absorb impact stress through strain, so that if the unit is dropped, the impact is absorbed by the cushioning members, thereby cushioning the hard disk drive unit from shock. The hard disk drive devices include those intended for internal installation in a computer, as well as portable types transportable separately from a computer. Requirements for such portable hard disk drives include especially high shock resistance, as well as compact size.

SUMMARY

An advantage of some aspects of the present invention is to provide a storage device having exceptional shock resistance, as well as achieving compact size.

The present invention is addressed to attaining the above objects at least in part according to the following aspects of the invention.

According to an aspect of the invention there is to provide a storage device comprising a casing that defines a housing chamber; a disk drive unit housed within the housing chamber; and a cushioning member interposed between the disk drive unit and an inside wall of the casing and adapted to receive stress and absorb impact stress through strain. The cushioning member includes a first layer situated towards the inside wall of the casing, a second layer situated towards the disk drive unit, and a third layer situated between the first layer and the second layer; and materials of the cushioning member are established such that the third layer has lower hardness than the first layer and the second layer.

According to the storage device of the first aspect, despite the thinness of the cushioning members it is possible to reduce the maximum acceleration during impact such as when the device is dropped; and where the operational warranty of the disk drive unit is specified in terms of a guaranteed peak value for acceleration, enhanced reliability against shocks is afforded. Moreover, enhanced shock resistance does not come at the cost of increased thickness of the cushioning members, thus contributing to compact size.

A second aspect features hardness of between E40 and E70 for the first layer and the second layer, and hardness of between E1 and E20 for the third layer, based on JIS K6253 standard. A third aspect features thickness T1, T2, T3 of the first layer, the second layer, and the third layer such that $T3 \geq T1$ and $T3 \geq T2$. A fourth aspect features ratios of the first layer, the second layer, and the third layer such that $T1:T2=1:1-3$ and $T1:T3=1:1-5$.

A fifth aspect features the hardness of the cushioning member is configured such that an half value interval is 2.0 ms or more, where the half value interval is a period that designates from a first peak value to a second peak value through transient interval, and is 50% or less of the first peak value, measured by an acceleration sensor, when the acceleration sensor is installed on the disk drive unit and then the storage device is dropped from a prescribed height.

These and other objects, features, aspects, and advantages of the present invention will become more apparent from the following detailed description of the preferred embodiments with the accompanying drawings.

DESCRIPTION OF THE PREFERRED EMBODIMENTS (1) General Features of Hard Disk Drive Device 10

Figure 1:
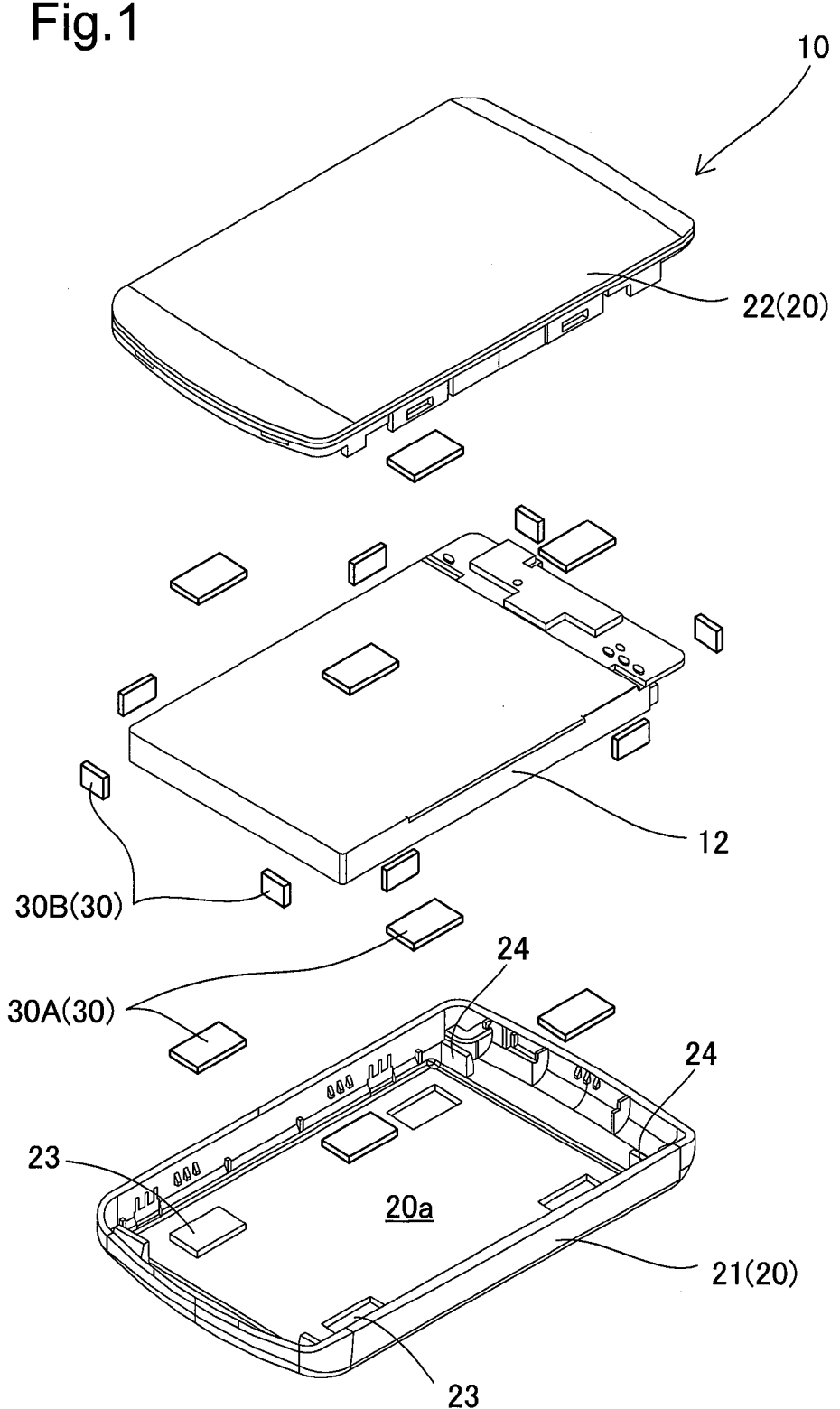
FIG. 1 is a perspective view depicting an exploded hard disk drive device according to an embodiment of the present invention.

FIG. 1 is a perspective view depicting an exploded hard disk drive device 10 (storage device) according to an embodiment of the present invention. The hard disk drive device 10 is of portable type and includes a hard disk drive unit 12 (disk drive unit), a casing 20 that houses the hard disk drive unit 12, and cushioning members 30 interposed between the hard disk drive unit 12 and the inside wall of the casing 20; and is connectable to a computer by a USB cable.

Figure 2:
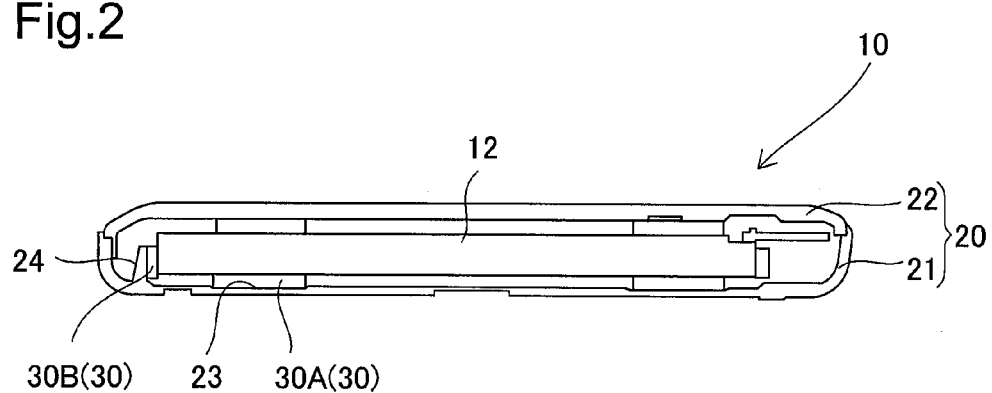
FIG. 2 is a cross sectional view of the hard disk drive device.

The hard disk drive unit 12 is a standard 2.5-inch hard disk drive housed in a unit case, and is provided on its back face with a USB connector for connection to an external electronic device. The casing 20 has a housing chamber 20a, and a lower cover 21 and an upper cover 22 joined by a locking mechanism such as hooks. Support pieces 24 and positioning recesses 23 are formed on the inside walls of the lower cover 21 and the upper cover 22, to which the cushioning members 30 are secured with an adhesive. FIG. 2 is a cross sectional view of the hard disk drive device 10. As depicted in FIG. 2, the cushioning members 30 are elastic members intimately adhered to the components when the hard disk drive unit 12 is installed within the casing 20, and provide shock resistance. The cushioning members 30 are composed of cushioning members 30A secured in the positioning recesses 23 and adapted to retain the upper and lower faces of the hard disk drive unit 12, and cushioning members 30B adapted to protect the side faces of the hard disk drive unit 12; these differ only in terms of size. Accordingly, in the following description, the cushioning members 30 constituting the cushioning members 30A are discussed.

(2) Features of Cushioning Members 30

Figure 3:
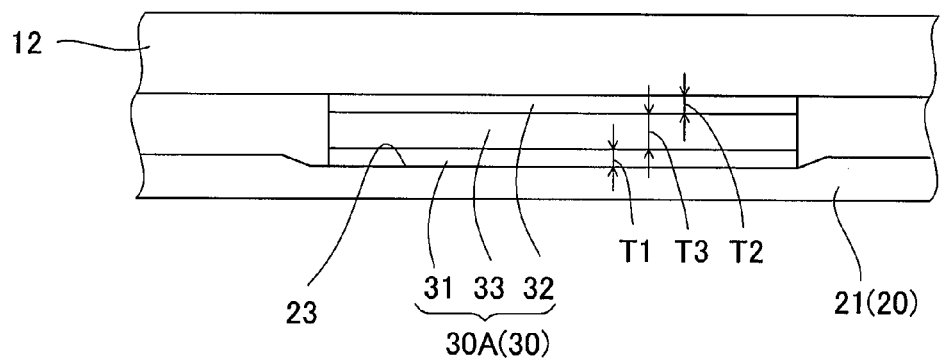
FIG. 3 is an enlarged cross sectional view of the vicinity of a cushioning member.

FIG. 3 is an enlarged cross sectional view of the vicinity of the cushioning member 30. The cushioning member 30 is formed of three layers including a first layer 31 positioned against the inside wall of the casing 20, a second layer positioned towards the hard disk drive unit 12, and a third layer 33 positioned between the first layer 31 and the second layer 32, with the layers being joined together by double-sided tape, an adhesive, vulcanization bonding, or other means. The first layer 31 is a layer primarily providing shock absorption and shape retention for secure attachment to the casing 20. The second layer 32 is a layer primarily providing shock absorption and shape retention for secure support of the hard disk drive unit 12. The third layer 33 is a layer primarily intended to provide shock absorption through compression in its thickness direction. The parameters of material, hardness, and thickness of each layer are determined with consideration to the shock absorbing capability and shape retention of the cushioning member 30 as a whole.

(2)-1 Material

In consideration of the qualities mentioned above, the material for the cushioning members 30 may be selected from polyurethane, butyl rubber, silicone gel, silicone rubber, and similar materials. The cushioning members 30 may employ the same material for each layer, or a suitably selected combination of different materials. Here, the use of the same material facilitates the process of bonding with an adhesive, through vulcanization bonding, and so on.

(2)-2 Hardness

The materials employed for the cushioning members 30 are ones that, in order to impart the qualities mentioned above, exhibit the hardness values given below, according to JIS (Japanese Industrial Standards; K6253) which specifies standard values for hardness of materials. In view of the importance of shape retention, the first layer 31 and the second layer 32 employ material of greater hardness than the third layer 33. Specifically, the first layer 31 may employ material of E40 to E70, preferably E50 to E60. For the second layer 32, given that shape retention is more important than for the third layer 33, the material may have hardness in the range E40 to E70, preferably E50 to E60. For the third layer, shock absorption is important, so material of E1 to E20, preferably E1 to E10, may be used. The hardness of the materials can be established through adjustment of the expansion ratio by addition of a blowing agent to the rubber material.

(2)-3 Thickness

With regard to thickness of the cushioning members 30, overall thickness is determined on the basis of the outside dimensions of the casing 20 with a view to compact size, then ratios of thickness for the different layers are determined in consideration of the material qualities and hardness discussed above. Here, where the thickness of the first layer 31, the second layer 32, and the third layer 33 are designated T1, T2, T3, the ratio of T1:T2 may be set to 1:1-3, and the ratios of T1:T2 may be set to 1:1-5. For example, where the overall thickness of the cushioning member 30 is 2 mm, the thickness T1 of the first layer 31 may be 0.5 mm, the thickness T2 of the second layer 32 may be 0.5 mm, and the thickness T3 of the third layer 33 may be 1 mm. Appropriate modifications are possible within the ratio ranges specified above.

(3) Hard Disk Drive Device Impact Testing

Figure 4:
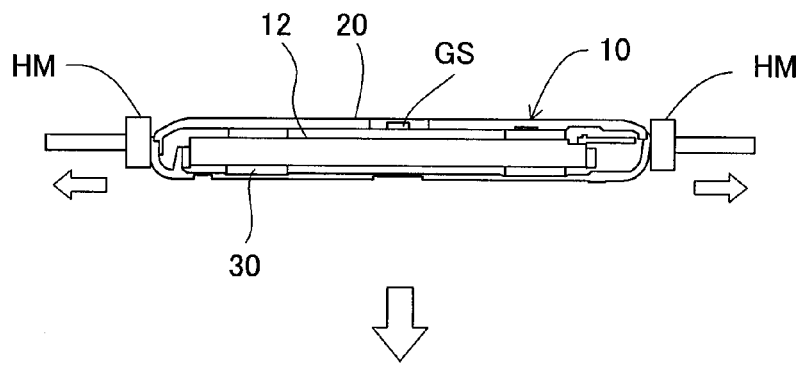
FIG. 4 shows impact test.
Figure 4:

The discussion now turns to impact testing carried out on the hard disk drive device 10 according to the present embodiment. FIG. 4 shows the impact test. The testing was conducted through drop tests of the hard disk drive device 10. Specifically, a sample composed of stacked layers of materials of different hardness for the cushioning members 30 inside the hard disk drive device 10 was used, and an acceleration sensor GS was mounted onto the outside wall of the hard disk drive unit 12. The hard disk drive device 10 was then clamped from both sides by a clamping members HM and held at a height of 20 cm; the clamping members HM were then moved in the direction of the arrows, thereby dropping the hard disk drive device 10 onto a floor FR made of wood (lauan) while measuring change in the sensor value of the acceleration sensor GS over time.

Figure 5:
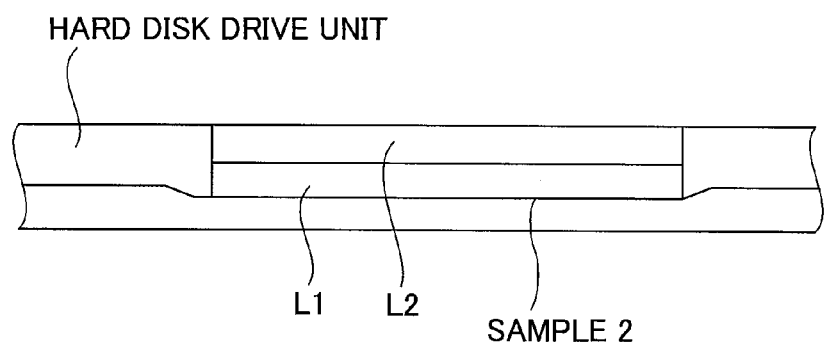
FIG. 5 shows a comparative example.

3-layer cushioning members (Sample 1) according to the embodiment shown in FIG. 3 and 2-layer cushioning members (Sample 2) according to the comparative example shown in FIG. 5 were used. Specifically, Sample 1 of the embodiment employed a sheet 0.5 mm in thickness made of polyurethane rubber material with E55 hardness (trade name PORON H-48 by Inoac Corporation) as the first layer 31 and the second layer 32, and a sheet 1.0 mm in thickness made of polyurethane rubber material having E2 hardness (PORON H-40P) as the third layer 33, the sheets being cut into 8 mm×15 mm rectangular pieces and bonded with double-sided tape.

As shown in FIG. 5, Sample 2 of the comparative example employed on the casing side a first layer L1 made of sheet material 1 mm in thickness having low hardness (the third material of Sample 1), and on the hard disk drive unit side a second layer L2 made of sheet material 1 mm in thickness having greater hardness than the first layer (the first and second materials of Sample 1), to produce an article of the same outside dimensions as Sample 1, which was then bonded.

Figure 6:
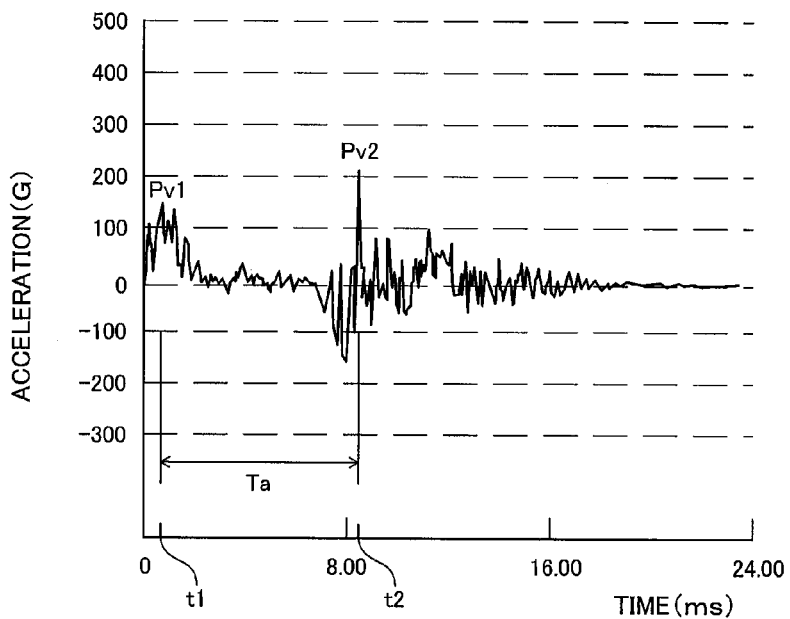
FIG. 6 shows test results for the present embodiment (Sample 1)
Figure 7:
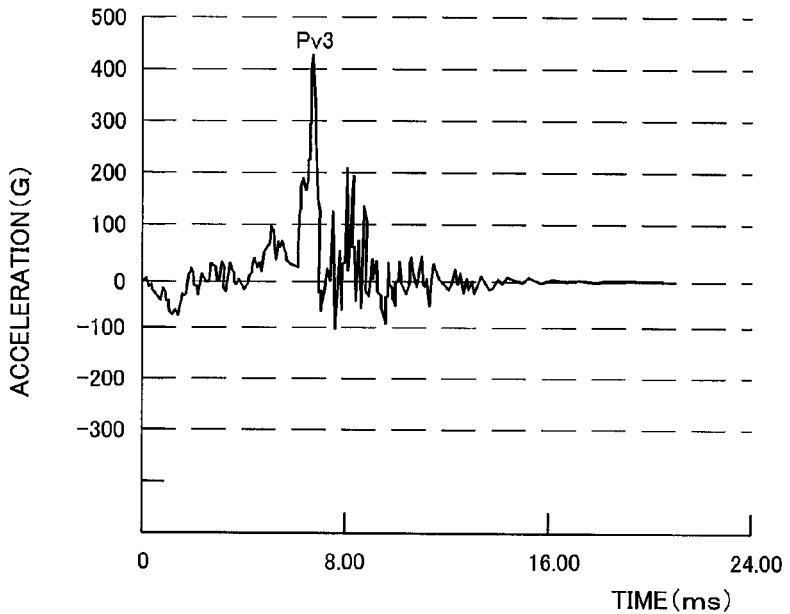
FIG. 7 shows test results for the comparative example (Sample 2)

FIG. 6 shows test results for the present embodiment (Sample 1); and FIG. 7 shows test results for the comparative example (Sample 2). In FIGS. 6 and 7, the vertical axis shows acceleration G (impact force) output by the acceleration sensor, and the horizontal axis shows time. In FIG. 6, at time t1 immediately following dropping of the hard disk drive device, a first peak value Pv1 of 150 G is observed, and then at time t2 following elapse of a transient interval Ta starting at time t1, a second peak value Pv2 of 200 G is observed. Between the first peak value Pv1 and the second peak value Pv2, beginning at 2.0 ms there appears a half value interval in which acceleration G is attenuated by 50% or more from the level of the first peak value Pv1. The appearance of peak values at two points during the drop test is attributed to the following reason. Immediately following dropping, the cushioning members are subjected to a shock wave by the hard disk drive unit, and the first peak value Pv1 is observed. At this point in time, the value of the first peak value Pv1 is reduced by the presence of the low-hardness third layer 33 which intimately adheres to the first layer 31. The impact force is then absorbed through compression of the third layer 33 of the cushioning members 30 for the duration of the transient interval Ta, and when the cushioning members 30 coalesce to a compressed state in which acceleration can no longer be attenuated, the second peak value Pv2 appears, and is subsequently attenuated gradually. That is, the third layer 33 is able to reduce the impact force represented by the initial first peak Pv1, to absorb the impact force for the duration of the transient interval Ta, and to reduce the subsequent second peak value Pv2 as well. Because the operational warranty of the hard disk drive unit is specified in terms of a guaranteed peak value for acceleration (e.g. 300 G), reduction of these two peaks values of acceleration affords enhanced reliability against shocks.

In the comparative example of FIG. 7 on the other hand, only a single peak value Pv3 appears immediately following dropping of Sample 2, and during the subsequent period there are observed gradually attenuating values that never exceed a value of 50% of the peak value Pv3. While not depicted in the drawing, cushioning members of the same material, i.e. formed by a single layer, produce results comparable to those of the comparative example, with a single large peak value of acceleration being observed.

(4) Working Effects of the Embodiment

The features of the embodiment described above afford the following effects.

The hard disk drive device 10 according to the present embodiment affords a reduced maximum value of acceleration, despite the cushioning members 30 having thickness of 2 mm, i.e. the same thickness as prior art cushioning members; and where the operational warranty of the hard disk drive unit is specified in terms of a guaranteed peak value for acceleration (e.g. 300 G), enhanced reliability against shocks is afforded. Moreover, enhanced shock resistance does not come at the cost of increased thickness of the cushioning members 30, thus contributing to compact size.

It is to be understood that there is no intention to limit the invention to the embodiment disclosed herein, and that modifications such as the following are to be included among various possible alternative modes considered to fall within the spirit and scope of the invention.

Figure 8:
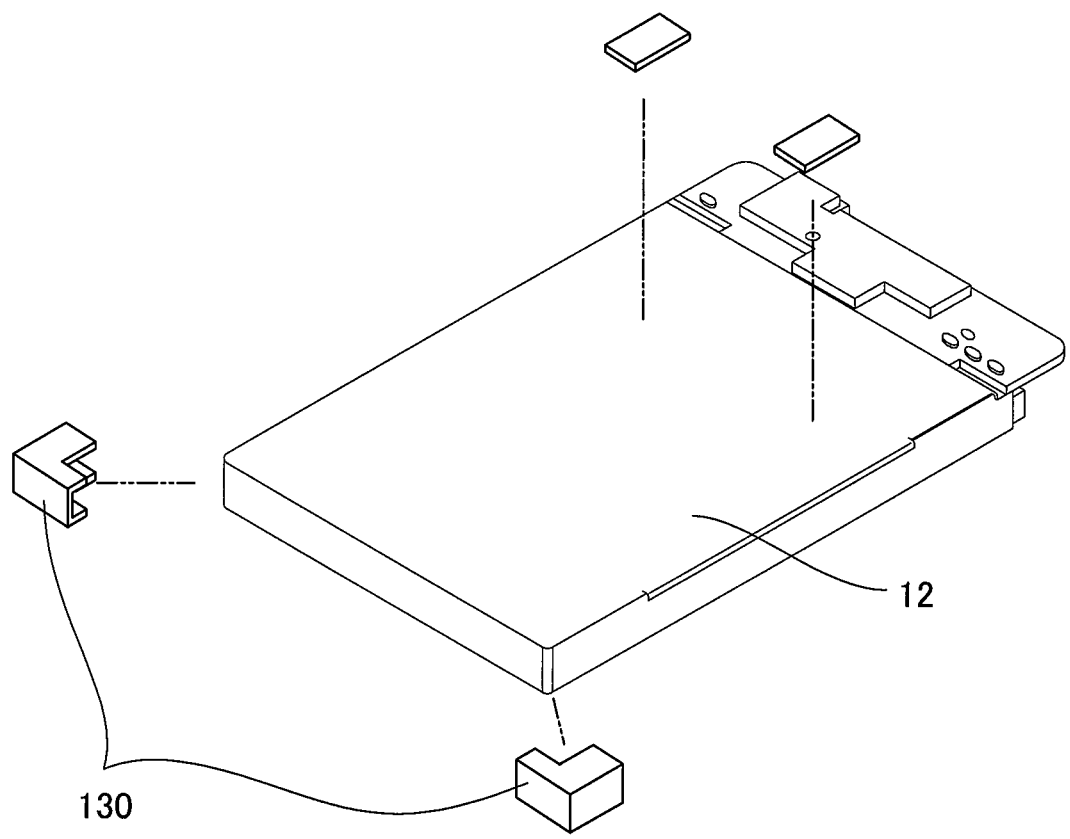
FIG. 8 shows cushioning members according to another embodiment.

FIG. 8 shows cushioning members 130 according to another embodiment. The present embodiment features an arrangement in which the cushioning members 130 are intimately adhered to the upper or lower faces and side faces at the corners of the hard disk drive unit 12. With these cushioning members 130, a single part protects each corner, so the number of parts can be reduced.

Whereas the preceding embodiment describes a portable hard disk drive device as the storage device, the invention is applicable to various devices such as computer internal hard disk drive devices, DVD devices, Blu-Ray (Registered Trademark of Sony) disk devices, and other such optical storage devices.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A storage device comprising a casing that defines a housing chamber; a disk drive unit housed within the housing chamber; and a cushioning member interposed between the disk drive unit and an inside wall of the casing and adapted to receive stress and absorb impact stress through strain;
    wherein the cushioning member includes a first layer situated towards the inside wall of the casing, a second layer situated towards the disk drive unit, and a third layer situated between the first layer and the second layer; and
    materials of the cushioning member are established such that the third layer has lower hardness than the first layer and the second layer, wherein T1:T2=1:1-3, and T1:T3=1:1-5, where T1, T2, and T3 designate thickness of the first layer, the second layer, and the third layer respectively.

2. The storage device in accordance with claim 1, wherein the hardness of the cushioning member is configured such that an half value interval is 2.0 ms or more, where the half value interval is a period that designates from a first peak value to a second peak value through transient interval, and has 50% or less of the first peak value, measured by an acceleration sensor, when the acceleration sensor is installed on the disk drive unit and then the storage device is dropped from a prescribed height.

3. The storage device in accordance with claim 1, wherein the third layer is a non-liquid material.

* * * * *